J. W. BROWN, Jr.
MOLDING MACHINE.
APPLICATION FILED FEB. 20, 1911.

1,025,737.

Patented May 7, 1912.

Witnesses—

Inventor—
John W. Brown, Jr.
by his Attorneys—
Howson & Howson

J. W. BROWN, Jr.
MOLDING MACHINE.
APPLICATION FILED FEB. 20, 1911.

1,025,737.

Patented May 7, 1912.
9 SHEETS—SHEET 4.

J. W. BROWN, Jr.
MOLDING MACHINE.
APPLICATION FILED FEB. 20, 1911.

1,025,737.

Patented May 7, 1912.

Inventor:—
John W. Brown, Jr.
by his Attorneys.
Howson & Howson

Witnesses:
Walter F. Pullinger
Nelle A. Burrows

J. W. BROWN, Jr.
MOLDING MACHINE.
APPLICATION FILED FEB. 20, 1911.

1,025,737.

Patented May 7, 1912.
9 SHEETS—SHEET 9.

Witnesses.—

Inventor.—
John W. Brown Jr.
by his Attorneys.—

UNITED STATES PATENT OFFICE.

JOHN WILSON BROWN, JR., OF PHILADELPHIA, PENNSYLVANIA, ASSIGNOR TO THE ENTERPRISE MANUFACTURING COMPANY OF PENNSYLVANIA, OF PHILADELPHIA, PENNSYLVANIA, A CORPORATION OF PENNSYLVANIA.

MOLDING-MACHINE.

1,025,737.      Specification of Letters Patent.      Patented May 7, 1912.

Application filed February 20, 1911. Serial No. 609,563.

*To all whom it may concern:*

Be it known that I, JOHN WILSON BROWN, Jr., a citizen of the United States, residing in Philadelphia, Pennsylvania, have invented certain Improvements in Molding-Machines, of which the following is a specification.

This invention relates to certain improvements in automatic molding machines for which Letters Patent were granted to me on the 15th day of September 1896, and numbered 567,884.

The object of the present invention is to improve the construction of the machine, making it more accurate than heretofore.

In the accompanying drawings.

A is the base of the machine upon which is mounted the standard B. This standard extends through the center of the machine.

B′ is a post and connecting this post with the standard B is a cross frame $B^2$ which carries the mechanism for compressing the sand in the mold.

C is the driving shaft and on this shaft is a worm C′ which meshes with a worm wheel $C^2$ on the hub of the pawl arm $C^3$ carrying a pawl $c$ engaging the internal teeth on the worm wheel. The object of this construction is to automatically stop the machine at every quarter turn.

A sliding rod $d$ is mounted in suitable bearings and normally rests in the path of the pawl $c$, thus throwing the pawl out of engagement with the worm wheel and preventing the arm moving with said worm wheel, and as this arm is secured to the shaft $C^4$, through which motion is imparted to the machine, it will be seen that the mechanism will be stopped until the pawl is released by the withdrawal of the rod $d$. This rod $d$ is connected to one arm of a bell crank lever $d'$; the other arm being connected to the core $d^2$ of a solenoid magnet D, Fig. 4, controlled by the operator.

Figure 4:
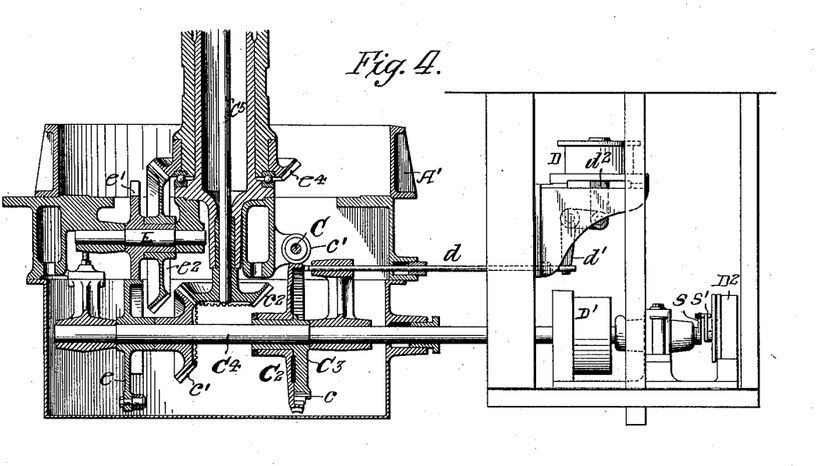
Fig. 4, is a sectional view of the base of the machine on the same line as Fig. 3, showing its connection with the operating mechanism.
Figures 5, 6:
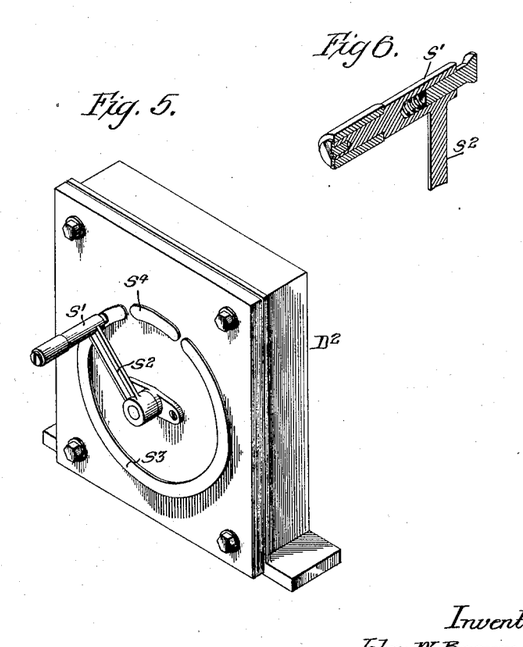
Fig. 5, is a perspective view of the controller illustrated in Fig. 4.
Fig. 6, is a detached sectional perspective view of the part of the controller frame illustrated in Fig. 5.

In order to prevent the shaft C moving past a given point by its own momentum, I provide an electric brake D′, which is mounted on the shaft $C^4$, Fig. 4, and on the end of this shaft is an arm $s$ which engages the brush $s'$ on the arm $s^2$ of the switch $D^2$. This switch has a long segmental contact plate $s^3$ and a short contact plate $s^4$. By this construction the current passes through the magnetic brake when the brush $s'$ travels over the short contact plate $s^4$ and immediately it passes this plate the circuit is broken and the shaft is free from the brake. By this means the arm $C^3$ on the shaft will not be driven past the end of the rod $d$, but will gradually stop at the rod.

On the shaft $C^4$ is a bevel wheel $c'$, which meshes with a bevel wheel $c^2$ on the vertical shaft $C^5$ extending through the standard B and adapted to suitable bearings thereon. On the upper end of the shaft $C^5$ is a bevel wheel $c^3$ which meshes with a bevel wheel $c^4$ on a horizontal shaft $C^6$ having its bearings in the cross frame $B^2$. This shaft controls the air valves of the compression plunger. On the shaft $C^4$ is a wiper $e$ which engages a star wheel $e'$ on the shaft E; the construction of the parts is such that when the wiper $e$ is not operating to move the wheel $e^2$ the wheel is locked. On the hub of the star wheel $e'$ is a bevel wheel $e^2$ which meshes with a bevel wheel $e^4$ secured to the hub E′ of the carrying frame $E^2$. This hub has its bearings upon the standard B and between the hub and the base of the standard are anti-friction balls, in the present instance.

On the carrying frame are mounted the several platforms, four in the present instance, which support the flasks, so that the frame will be moved, through the medium of the star wheel, one-fourth of a revolution, then locked in position and again moved one-fourth of a revolution and so on, allowing sufficient time for filling the flasks with sand, ramming the flasks and the removal of the flasks from the machine.

On each arm of the carrying frame $E^2$ is mounted a vertical plunger F carrying at its upper end the pattern support $f$, and mounted on the lower end of each plunger is a traction wheel $f'$ adapted to travel on a cam rail $A'$ secured to the base of the machine. This rail is of an even height except at one point which is depressed sufficiently to allow the pattern to clear the mold before the operator removes the mold from the machine. Secured to each plunger and to the frame are flexible covers $f^2$ which prevent sand gaining access to the bearings. Mounted on each arm of the carrying frame are supports $E^3$ for the stripping plates $E^4$ which support the flasks, and into each plate passes the pattern support $f$, closing the bottom of the flask, allowing it to be filled with sand. Pins $f^3$ on the stripping plate enter the openings in the support, preventing the plate from turning. Pivoted to each support $E^3$ is a lever G on which a false flask $G'$ is pivotally mounted. This false flask rests upon the flask X so as to allow sufficient sand to be placed in the flask, before being subjected to pressure, in order to obtain the density required. The sand remaining above the flask is removed by a strike-off Z mounted on a fixed arm $Z'$, Fig. 1. The lever G is connected to a lever $G^2$ pivoted to lugs on the under side of the carrying frame and on this lever is a traction wheel $g$ which bears against the inner surface of a rail $A^2$ secured to the base of the machine. The rail $A'$ is a cam rail and is so formed that it will force the false flask $G'$ down upon the flask X and hold it there until the flask is filled with sand and the sand compressed, after which it will allow the false flask to be lifted clear of the flask X so that it can be removed and another flask placed in its stead.

In order to hold the wheels $g$ against the rail $A^2$, I connect each pair of levers G by a two-part rod $g^3$ and connecting the two parts of the rod is a closed tension spring $g^4$. This tension spring causes the rollers $g$ to retain their contact at all times against the rail $A^2$.

In order to hold the false flask $G'$ in a horizontal position when it is moved from the flask X, I provide a cam $g^2$ over which travels an arm $g'$ connected to the false flask. Thus the false flask when raised is held in the horizontal position so as to clear the strike-off bar Z, and after it passes the strike-off bar the cam is discontinued and the false flask is then free to move on its pivot.

K is a plunger for forcing sand into the mold. This plunger is adapted to a cylinder $B^3$ forming part of the frame $B^2$, in the present instance. The plunger is provided at its lower end with an air cushion $K'$ so that the bottom of the plunger will conform, to a certain degree, to the irregularities of the pattern and sand, thus forming a mold in which the sand will be packed more evenly than if a rigid plunger was used.

Figure 7:
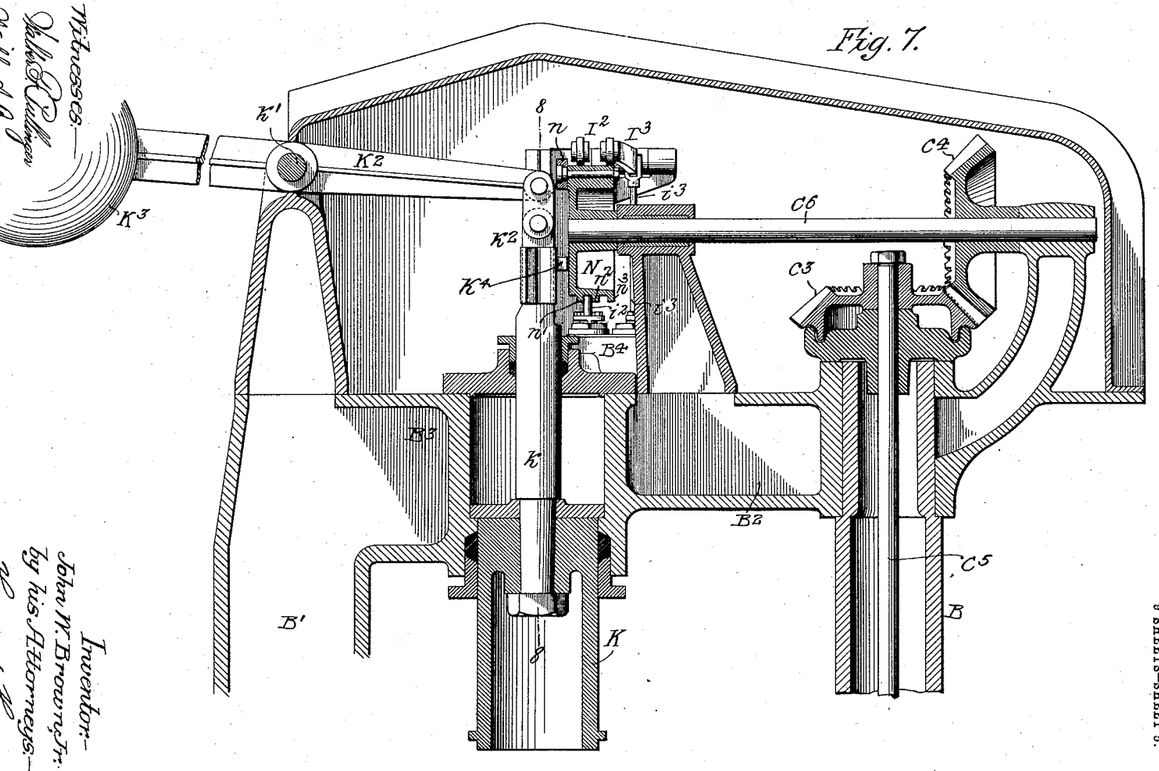
Fig. 7, is an enlarged sectional view of the overhead mechanism similar to Fig. 3.

Projecting from the upper end of the plunger K is a rod $k$ and this rod is connected to the lever $K^2$ by a link (Fig. 7) having a counterbalance weight $K^3$. The lever $K^2$ is pivoted at $k'$ to the frame $B^2$, so that when the cylinder is relieved of pressure the counter-weight lifts the plunger clear of the mold. On the upper end of the rod $k$ is a cross head $k^2$ adapted to vertical guides $k^3$, and on the shaft $C^6$ is a cam wheel N having a roller $n$ which contacts with a platform $k^4$ to positively raise the plunger (Figs. 7 and 8).

In the cap $B^4$ of the cylinder $B^3$, as illustrated in Figs. 8 to 11 inclusive, are ports $i$, $i'$, the port $i$ being the inlet port and the port $i'$ the outlet port. I is an inlet valve adapted to a seat in the passage $i$, as clearly shown in Fig. 11. This valve is carried by a rod $i^2$ and this rod is connected in turn to an arm $I^2$ carrying the rollers which rest upon the cam wheel N.

Figures 8, 9, 10, 11:
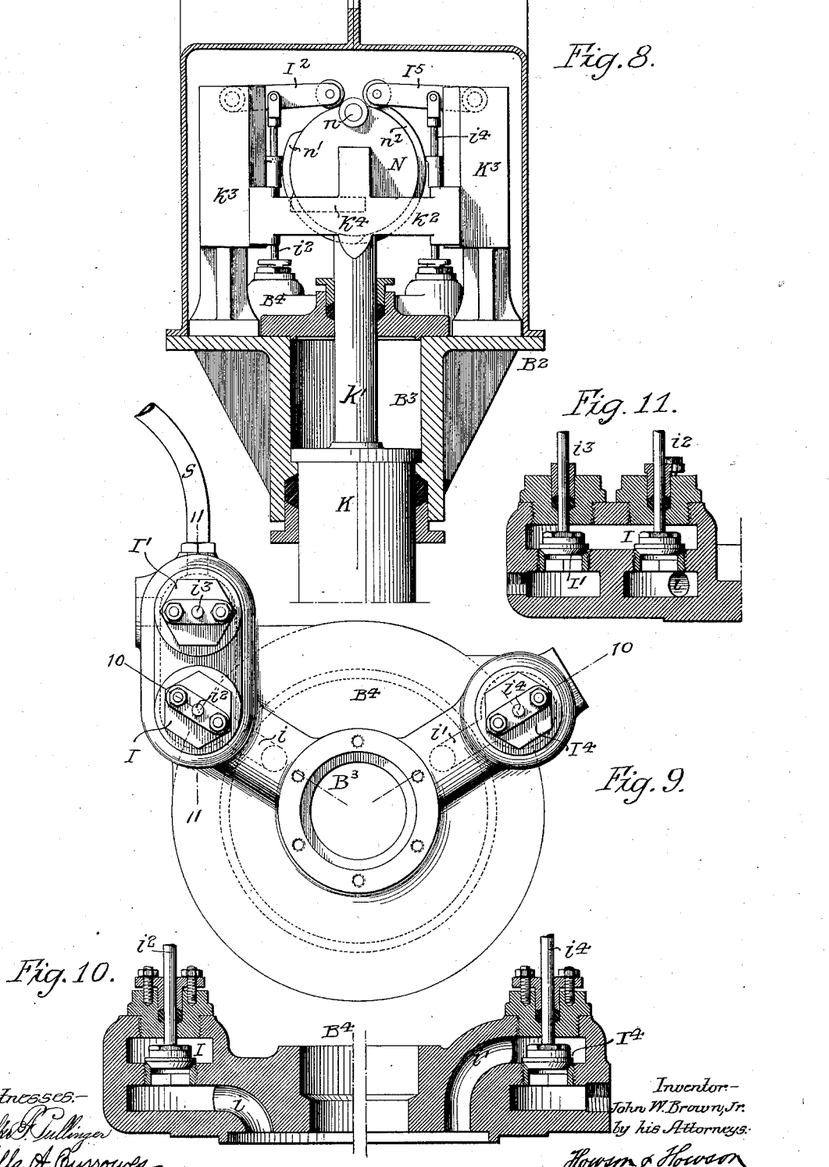
Fig. 8, is an enlarged sectional view on the line 8—8, Fig. 7.
Fig. 9, is a plan view of the mechanism illustrated in Fig. 8, showing the location of the valves.
Fig. 10, is a transverse sectional view on the line 10—10, Fig. 9.
Fig. 11, is a sectional view on the line 11—11, Fig. 9.

$I^4$ is the exhaust valve adapted to a seat in the passage $i'$, as indicated in Fig. 10. The stem $i^4$ of this rod is connected to an arm $I^5$ pivoted to the frame, as indicated in Fig. 8, and this arm carries a roller which is actuated by a cam segment $n^2$ upon the cam wheel N. The cam segment is so proportioned that it will open the valve $I^4$ at the proper time, allowing the air to escape from the cylinder; the roller $n$ on the cam wheel N returning the plunger to its elevated position.

$I'$ is a valve for controlling the flow of air to a blow pipe S. This blow pipe extends to a point in close proximity to the flask carrier at the point where the flask is taken from the carrier, so as to clear the flask carrier of any sand remaining after the flask has been removed. The stem $i^3$ of this valve is attached to a lever $I^3$ which is actuated by one of the cams on the cam wheel N. On this cam wheel are cams $n'$, $n^2$, $n^3$ which actuate the arms $I^2$, $I^5$, $I^3$, respectively, at the proper moment to supply the cylinder and blast pipe with air.

Figure 12:
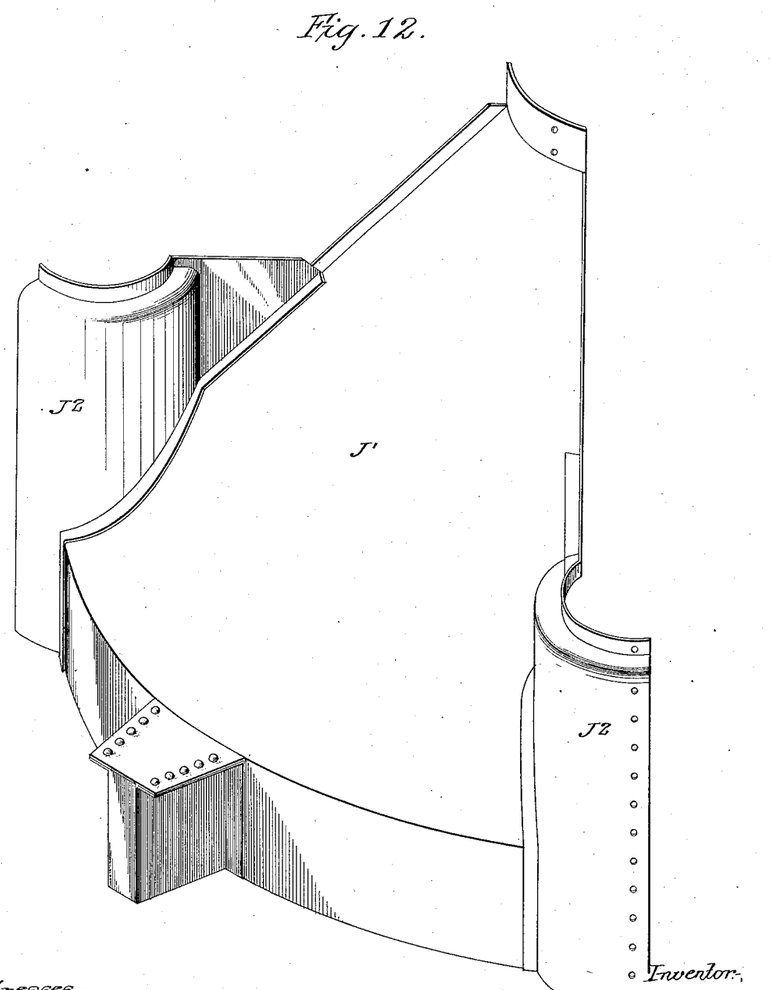
Fig. 12, is a view of one of the shield sections for inclosing the lower part of the machine.

Depending from the carrying frame is an annular hood J which extends to a point in close proximity to the floor, so as to shield the working parts as much as possible from the sand, and mounted on the carrying frame is a hood J', Fig. 12, made in sections to extend between each of the arms of the carrying frame, and the sections have segmental portions J² which partially encircle the bearings which carry the plungers; thus all the mechanism under the carrying frame is protected from the sand.

Figure 1:
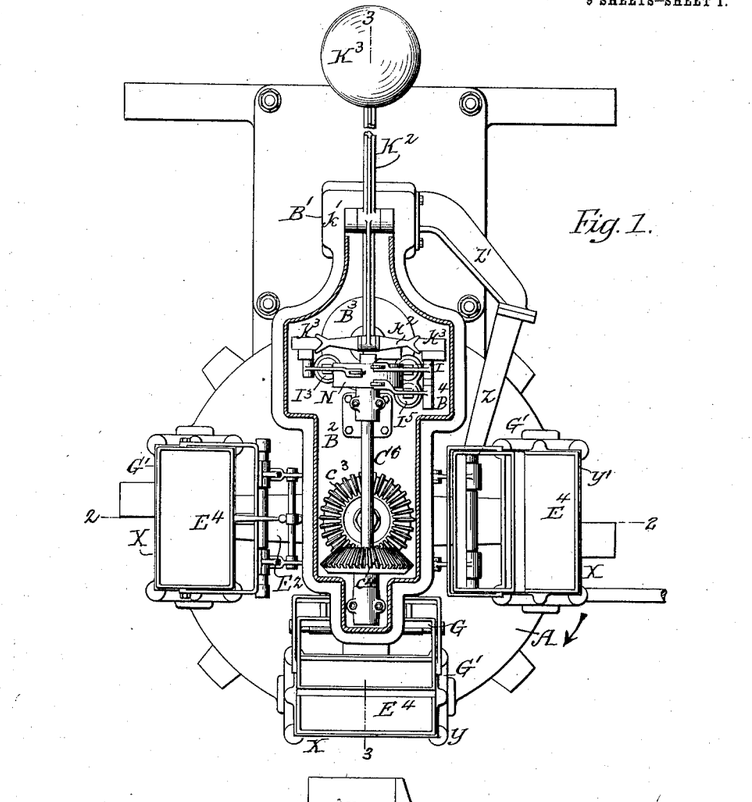
—Figure 1, is a plan view of my improved molding machine; with the upper cap in section.
Figure 2:
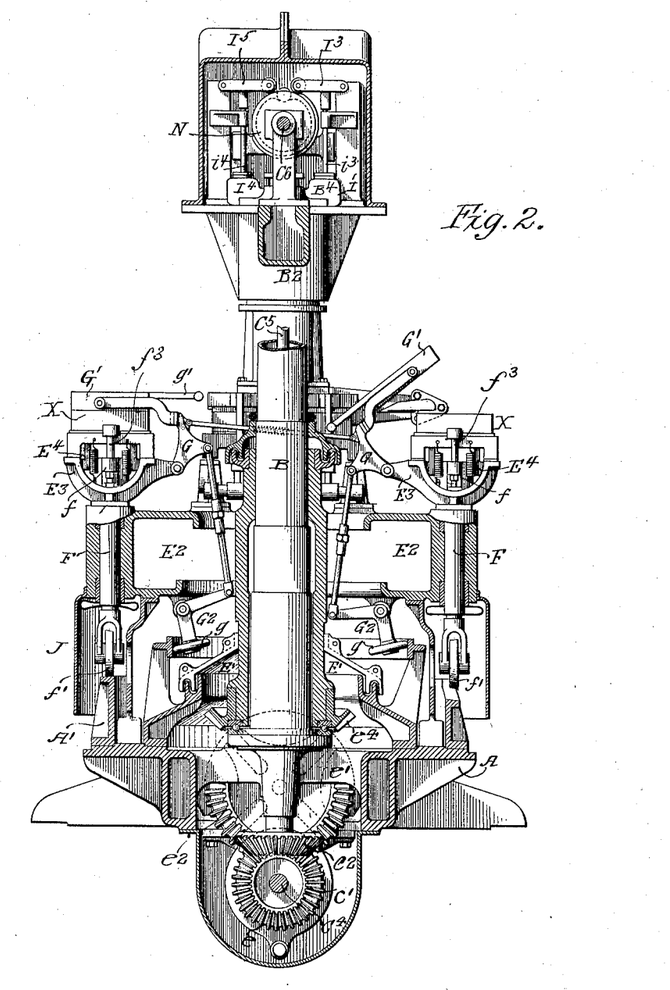
Fig. 2, is a sectional elevation on the line 2—2, Fig. 1.
Figure 3:
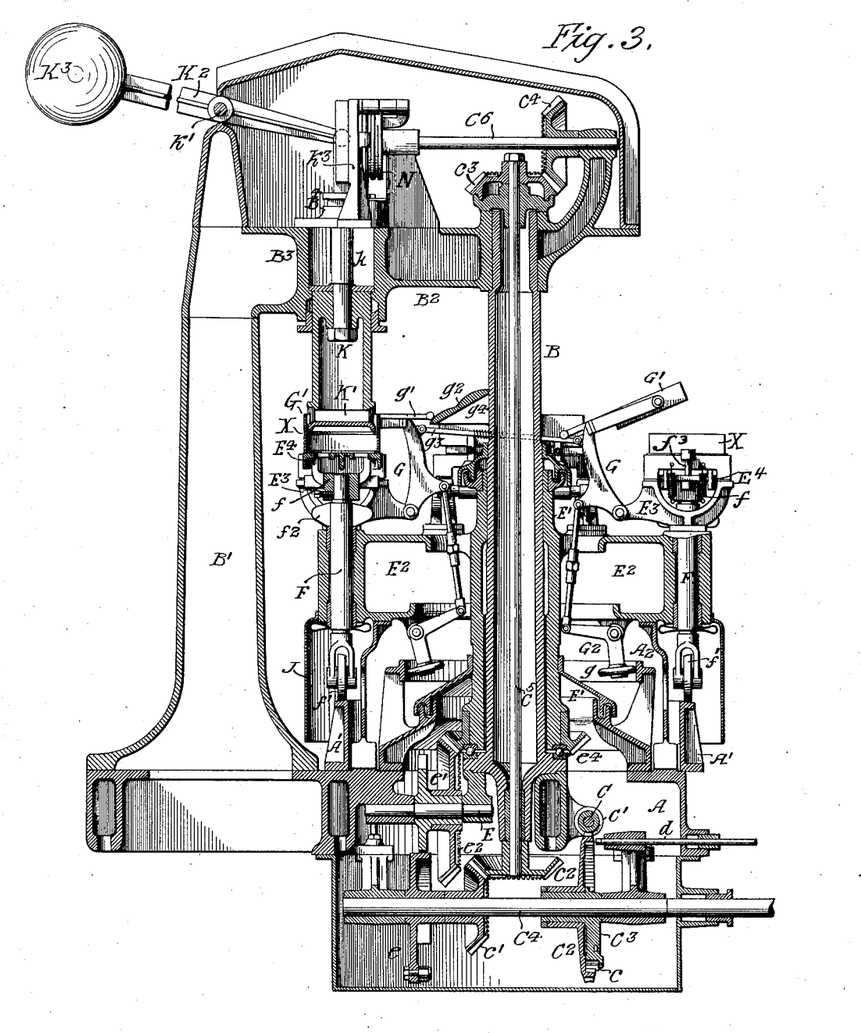
Fig. 3, is a sectional elevation on the line 3—3, Fig. 1.
Figure 13:
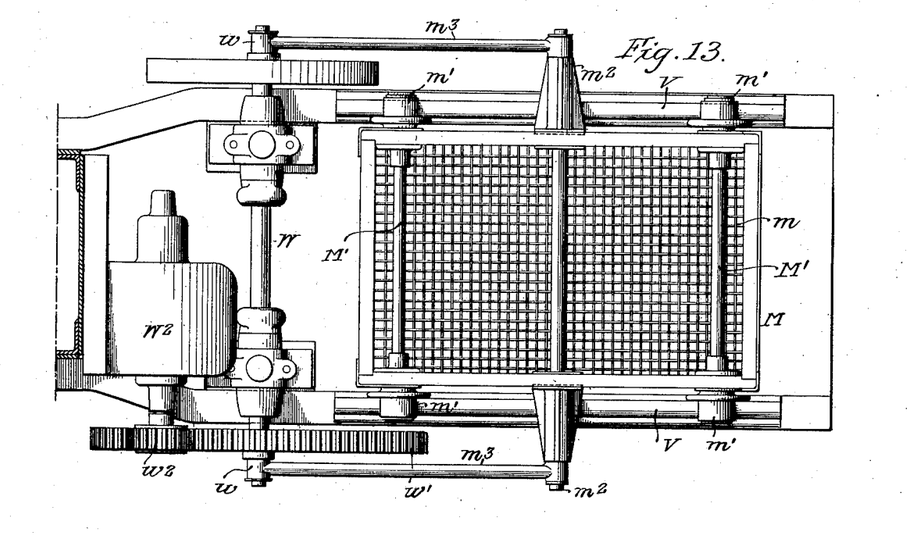
Fig. 13, is a plan view of the sand screen.

Referring to Fig. 13, M is a reciprocating sieve having a wire screen $m$, as indicated in Fig. 1, and this sieve is located at the filling point for the flasks and sand is carried up on a bucket elevator T and discharged through a chute $t$ into the sieve M, which sifts the sand as it passes into the mold, breaking up any lumps which may accumulate in transit. A hopper may be used in place of the inclined chute, if desired, where the molding machine does not form one of the elements of a complete plant.

Figure 14:
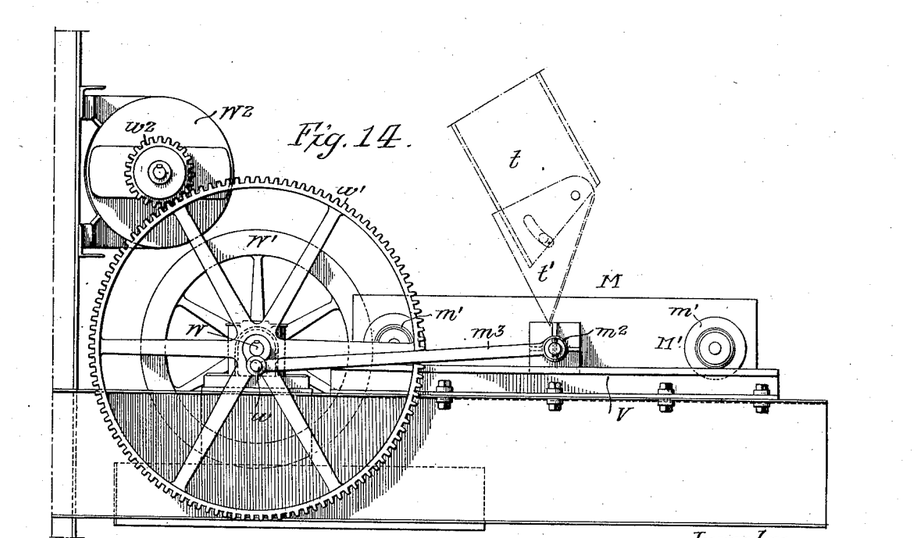
Fig. 14, is a side view of the same.
Figure 15:
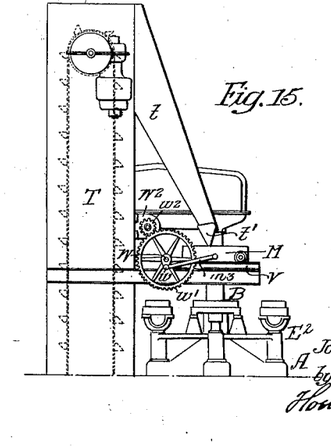
Fig. 15, is an outline view showing the method of filling the flasks with sand.
Figure 16:
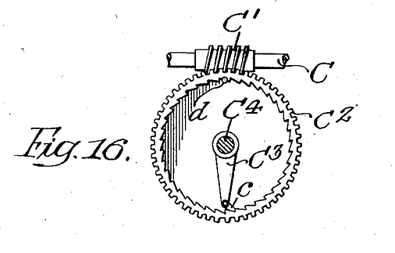
Fig. 16, is a sectional view on the line 16—16, Fig. 3.
Figure 17:
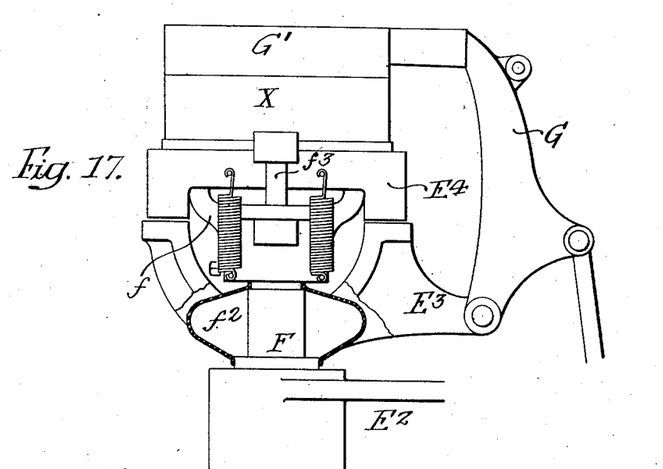
Fig. 17, is an enlarged sectional view of a portion of the machine, showing the flask and the supporting members.
Figure 18:
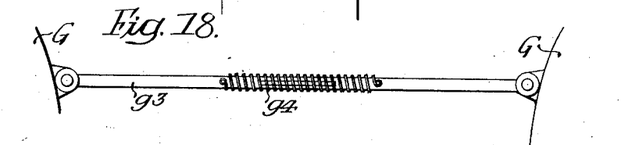
Fig. 18, is a view of a detail of the machine.

The screen frame, in the present instance, is carried by two axles M' having flanged wheels $m'$ which are mounted on rails V. A reciprocating motion is imparted to the screen frame M through a shaft W having crank arms $w$, which are connected by rods $m^3$ to trunnions $m^2$ on the frame M. On the shaft W is a fly wheel W' and a gear wheel $w'$. This gear wheel meshes with a pinion $w^2$ on the shaft of an electric motor W². Sand is discharged into the screen frame M through the chute $t$ which is provided with a pivoted end or gate $t'$, shown by dotted lines in Fig. 14, and the pivoted end may be adjusted to regulate the flow of sand from the chute.

The operation of the machine is as follows:—The flasks are put in position on the carrying frame at the point $y$ and on the intermittent rotation of the carrying frame the flask is brought under the sieve M in line with the feeding chute for sand and sand is deposited in the flask at this point; the false flask being in position prior to the discharge of the sand. After sufficient sand is introduced into the flask and false flask the carrying frame is turned another quarter of a revolution and the flask is then in line with the plunger K, and while the carrying frame is at rest the ram is forced down, compressing the sand in the flask. After the return of the ram the carrying frame is moved another quarter of a turn and during this movement it passes under the strike-off Z and this strike-off removes any sand which may project above the upper surface of the flask. The flask, with the sand mold, is then in condition to be removed by the operator stationed at $y'$; the pattern being first withdrawn clear of the sand, after which the flask is taken from the supporting frame and removed from the machine; the carrying frame moving another quarter turn to its first position where another flask is placed in position upon the stripper plate, when the above operation is repeated. The mechanism is preferably controlled through an electric circuit.

I claim:

1. The combination in a molding machine, of a standard; a carrier; means for intermittently moving the carrier on the standard; a cylinder located above the carrier; a flange therein; a vertical driving shaft extending through the standard; a horizontal shaft adapted to bearings secured to the upper end of the standard and geared to the vertical shaft; a wheel on the horizontal shaft having cams; arms actuated by the cams; passages communicating with the cylinder in which the plunger is mounted; a valve in each passage; and arms to which the stems of the valves are connected; said arms being actuated by the cams on the cam wheel.

2. The combination in a molding machine, of a standard, a carrier, means for intermittently moving the carrier on the standard, a plunger, a vertical driving shaft, a horizontal shaft geared thereto, a cam wheel on the horizontal shaft, cams thereon, arms actuated by the cams, inlet and exhaust valves communicating with the cylinder in which the plunger is mounted and connected to the said arms, with a blow pipe leading to one of the flasks, and a valve controlling the admission of air to said blow pipe and an arm connected to the valve and also actuated by a cam on the cam wheel.

3. The combination in a molding machine, of a standard, a carrier for the flasks mounted thereon, means for intermittently moving the said carrier, a frame, a cylinder carried by the frame, a plunger mounted within the cylinder, a counterbalance for the plunger, a cam wheel, means for rotating said cam wheel, an inlet and an exhaust valve for the plunger, arms connected to said inlet and exhaust valves and actuated by the cam wheel, a lug on an extension of the plunger arranged to be engaged by the roller to move the plunger away from the flask.

4. The combination in a molding machine, of a standard, an intermittently rotated carrier for the flasks, pivoted levers, false flasks, a fixed cam, an arm arranged to travel over the cam so as to hold the false flask in a horizontal position during a portion of its movement.

5. The combination of a standard, an intermittently movable rotating carrier for the flasks, a pressure cylinder and plunger, a lever adapted to each flask carrier, a false flask pivotally mounted on the lever, means for actuating the said lever, a fixed cam, an arm on each false flask arranged to travel on the cam, a strike off, the cam being so located that it will hold the false flask in a horizontal position while traveling over the strike off.

6. The combination of a standard, an intermittently rotating carrier for the flasks, a pivoted lever mounted on each carrier, a false flask carried by each lever, a two-part rod connecting the opposite levers, and a tension spring connecting the two parts of the rod, with a rail, a lever connected to each of the false flask-carrying levers, a roller on each of said levers bearing against the rail, with a spring tending to force the rollers against the rail.

7. The combination in a molding machine, of a driving shaft, an arm thereon carrying a pawl, a driving wheel having internal teeth engaged by the pawl, a stop rod for limiting the movement of the pawl arm, with a magnetic brake mounted on the shaft, and a switch actuated by the shaft for breaking and making the circuit leading to the magnetic brake.

In testimony whereof, I have signed my name to this specification, in the presence of two subscribing witnesses.

JOHN WILSON BROWN, Jr.

Witnesses:
WM. E. SHUPE,
WM. A. BARR.

Copies of this patent may be obtained for five cents each, by addressing the "Commissioner of Patents, Washington, D. C."